(12) United States Patent
Lee et al.

(10) Patent No.: US 10,291,600 B2
(45) Date of Patent: May 14, 2019

(54) SYNCHRONIZING SECURE SESSION KEYS

(71) Applicant: International Business Machines Corporation, Armonk, NY (US)

(72) Inventors: Cheng-Ta Lee, Taipei (TW);
Wei-Shiau Suen, Taichung (TW);
Ming-Hsun Wu, New Taipei (TW);
Rick M. F. Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 15/183,837

(22) Filed: Jun. 16, 2016

(65) Prior Publication Data
US 2017/0366524 A1 Dec. 21, 2017

(51) Int. Cl.
*H04L 29/06* (2006.01)
*H04L 9/08* (2006.01)

(52) U.S. Cl.
CPC .......... *H04L 63/061* (2013.01); *H04L 9/0894* (2013.01); *H04L 63/0272* (2013.01); *H04L 63/0876* (2013.01); *H04L 63/205* (2013.01); *H04L 63/166* (2013.01)

(58) Field of Classification Search
CPC . H04L 63/061; H04L 63/0876; H04L 9/0894; H04L 63/205; H04L 63/0272; H04L 63/166
See application file for complete search history.

(56) References Cited

U.S. PATENT DOCUMENTS

| | | | |
|---|---|---|---|
| 7,055,027 B1 * | 5/2006 | Gunter | H04L 63/0428 709/223 |
| 8,543,808 B2 | 9/2013 | Ahmed | |
| 8,959,329 B2 | 2/2015 | Altman | |
| 9,009,461 B2 | 4/2015 | Martini | |
| 9,077,709 B1 | 7/2015 | Dall et al. | |
| 9,185,088 B1 | 11/2015 | Bowen | |
| 9,419,942 B1 * | 8/2016 | Buruganahalli | H04L 63/0227 |
| 2004/0015725 A1 | 1/2004 | Boneh et al. | |
| 2008/0130900 A1 * | 6/2008 | Hsieh | H04L 63/145 380/278 |
| 2008/0235508 A1 * | 9/2008 | Ran | H04L 63/0428 713/151 |

(Continued)

OTHER PUBLICATIONS

Ataide, R., "The Man in the Middle: Advantages of SSL Decryption," RSA, Feb. 7, 2013, 7 pages http://blogs.rsa.com/the-man-in-the-middle-advantages-of-ssl-decryption/.

*Primary Examiner* — Michael Pyzocha
(74) *Attorney, Agent, or Firm* — Nolan M. Lawrence (57) ABSTRACT

A first client encryption initiation is intercepted from a client. The first client encryption initiation is intended for a server. Based on the first client encryption initiation, a second client encryption initiation is initiated with the server. Receiving a server response from the server responsive to the initiated second client encryption initiation. A first secure connection is negotiated with the client. The first secure connection is based on the intercepted first client encryption initiation and based on the server response. A session key to perform secure communication with the client is obtained from the first secure connection. A second secure connection is established with the server. The second secure connection is based on the server response and the session key.

19 Claims, 3 Drawing Sheets

(56) References Cited

U.S. PATENT DOCUMENTS

| | | |
|---|---|---|
| 2008/0263215 A1* | 10/2008 | Schnellbaecher ... H04L 63/0281 709/229 |
| 2013/0191630 A1 | 7/2013 | Ylonen et al. |
| 2013/0198512 A1* | 8/2013 | Rubin ................ H04L 63/0823 713/157 |
| 2014/0082204 A1* | 3/2014 | Shankar ............... H04L 63/166 709/227 |
| 2014/0115702 A1 | 4/2014 | Li et al. |
| 2015/0113264 A1 | 4/2015 | Wang et al. |
| 2016/0127414 A1* | 5/2016 | Mazur ..................... H04L 63/18 713/151 |
| 2016/0226827 A1* | 8/2016 | Bohannon ........... H04L 63/0281 |
| 2017/0163624 A1* | 6/2017 | Mattsson ............. H04W 76/18 |
| 2017/0223054 A1* | 8/2017 | Wing ................ H04L 63/1416 |

\* cited by examiner

SYNCHRONIZING SECURE SESSION KEYS

BACKGROUND

The present disclosure relates to secure communications, and more specifically, to accessing secure communications by synchronizing secure session keys.

Secure communications permit users to share ideas and information (e.g., messages) with each other. In many cases, secure communications ensure the users that a third party does not have the ability to modify the messages. Sometimes, secure communications enable the users to prevent third parties from reading the messages. Secure communications form the basis of various communication methods on the Internet (e.g., email).

SUMMARY

Disclosed herein are embodiments of a method, system, and computer program product for viewing encrypted traffic. A first client encryption initiation is intercepted from a client. The first client encryption initiation is intended for a server. Based on the first client encryption initiation, a second client encryption initiation is initiated with the server. Receiving a server response from the server responsive to the initiated second client encryption initiation. A first secure connection is negotiated with the client. The first secure connection is based on the intercepted first client encryption initiation and based on the server response. A session key to perform secure communication with the client is obtained from the first secure connection. A second secure connection is established with the server. The second secure connection is based on the server response and the session key.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to secure communications, more particular aspects relate to accessing secure communications by synchronizing secure session keys. While the present disclosure is not necessarily limited to such applications, various aspects of the disclosure may be appreciated through a discussion of various examples using this context.

Typically, secure communications between two computer systems may be used by two parties to exchange information and ideas that are benign (e.g., text messages, photos of pets, party invitations, etc.). In some circumstances, however, users may utilize secure communications between computers to perform nefarious activities (e.g., network intrusions, cross-site scripts, viruses, malware, sensitive data leakages, etc.). These nefarious activities can cause economic harm as corporations may lose actual money or private data (e.g., banks may have money stolen through the bank's computer system, corporate trade secrets may be leaked through an employee's corporate-provided personal computer to a competitor through the Internet, etc.).

To provide security to try and combat the nefarious activities, corporations may try to access the secure communications that involve the various computer systems of the corporations. These secure communications can take the form of network messages (e.g., packets, datagrams, etc.). To access the secure communications the corporations may need to do a myriad of actions (e.g., intercept the messages from a client, undo the encryption securing the messages, re-encrypt the secured messages, and send the secure messages to a server, etc.).

One technique to access secure communications is to downgrade the secure traffic of a transport layer security (TLS) or secure sockets layer (SSL) session. As a client (a first computer) initiates a TLS handshake, a security program intercepts the handshake and removes the more mathematically difficult encryption options. The altered handshake is then passed onto a server (a second computer and intended recipient of the client's message) and the server then assents to communicating in a less secure format.

Continuing the first technique, after the TLS handshake completes the client and the server use the less secure encryption standard manipulated by the security program. The security program uses a brute-force technique to decrypt the less secure encryption standard. One drawback to this technique is detection—because one or more of the handshake messages between the client and the server have been modified, one or both of the client and the server may detect the change. In certain cases, a detected alteration may cause the client, server, or both to reject the alteration or to terminate the secure session. Another drawback is reduced security—while the security program may now be able to decrypt the traffic through brute force techniques, so could any other third party that wants to look at the encrypted traffic between the client and the server.

A second technique to access secure messages is for a security program to permanently pretend to be both a client and a server (a fake client and a fake server, respectively). The secure session is a TLS or SSL session and the secure session begins with a handshake initiated by a client. The security program intercepts the traffic of the client and pretends to be the server the client was trying to reach. The fake server and the client complete a secure handshake and establish a first secure session including a first session key. The security program additionally pretends to be a client and initiations a second secure handshake to the server the client was trying to reach. The fake client and the server complete a second secure handshake and establish a second secure session including a second session key.

One drawback to the second technique is the added complexity. There are two secure sessions occurring simultaneously and the security program must perform encryption and decryption with the client as well as perform a second encryption and decryption with the server for each message being exchanged between the client and server. A second drawback to the second technique is the inability of the security program to disconnect from the secure session. Because the session keys are not synchronized between the client and the server, the fake client and the fake server must be maintained by the security program or secure communications between the client and server terminate. Additionally, in the event that the security program does disconnect, the client and server may become aware of the security program and may try to securely communicate using an alternate protocol an alternative network or both.

In some embodiments of the present disclosure, various techniques may provide access to secure connections through multiple secure sessions while also synchronizing a single session key. These techniques may enable security programs to read messages from clients and servers. The access to the secure messages by the security programs may be undetectable by the client or the server. The security program may gain access while preventing access to third parties (e.g., without degrading the encryption standards utilizes by the client and server). Using the techniques of embodiments, the security program may utilize two encrypted TLS handshakes that synchronize one or more of the components of a TLS session (e.g., the pre-master secret, the session key, etc.).

Figure 1:
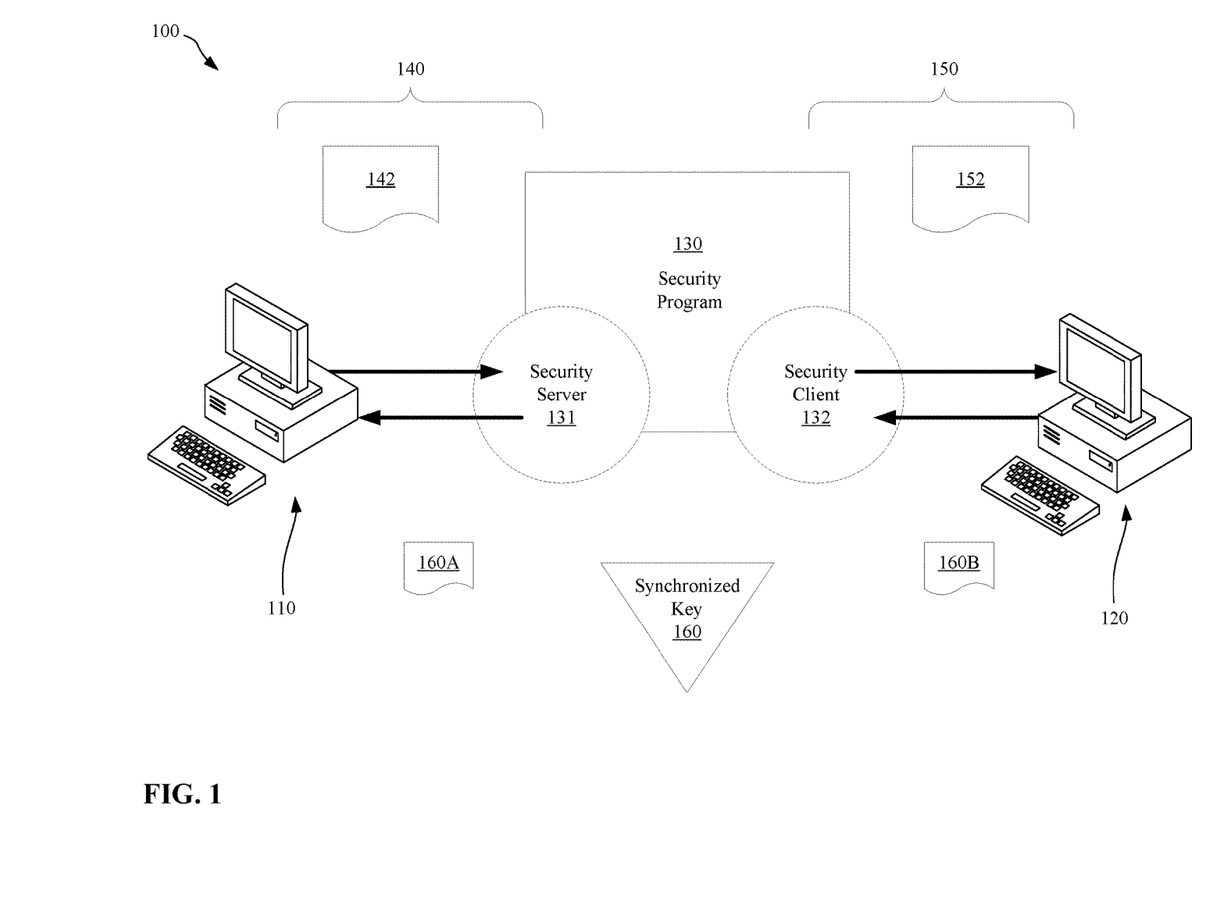
FIG. 1 depicts an example computing network of computers in accordance with embodiments of the present disclosure.

FIG. 1 depicts an example computing network 100 of computers in accordance with embodiments of the present disclosure. The computing network 100 may be one or more computers that are communicatively coupled to each other through various networks (e.g., wired, wireless, local area networks, wide area networks, etc.) using one or more protocols (e.g., the transmission control protocol). The computing network 100 comprises a client 110 and a server 120. The client 110 and the server 120 represent a first computing system and a second computing system, respectively. The client 110 and the server 120 may be assenting to perform encrypted communication with each other using a secure protocol (e.g., SSL, TLS, etc.). It should be appreciated, for purposes of the disclosure, that when a first computer system wants to initiate a secure communication with a second computer system that the first computer system may be called a client and the second computer system may be called a server. In some embodiments, the second computer system may wish to initiate a secure communication with the first computer system; the second computer system initiating a secure communication would be the client and the first computer system receiving the initiation would be the server.

Figure 3:
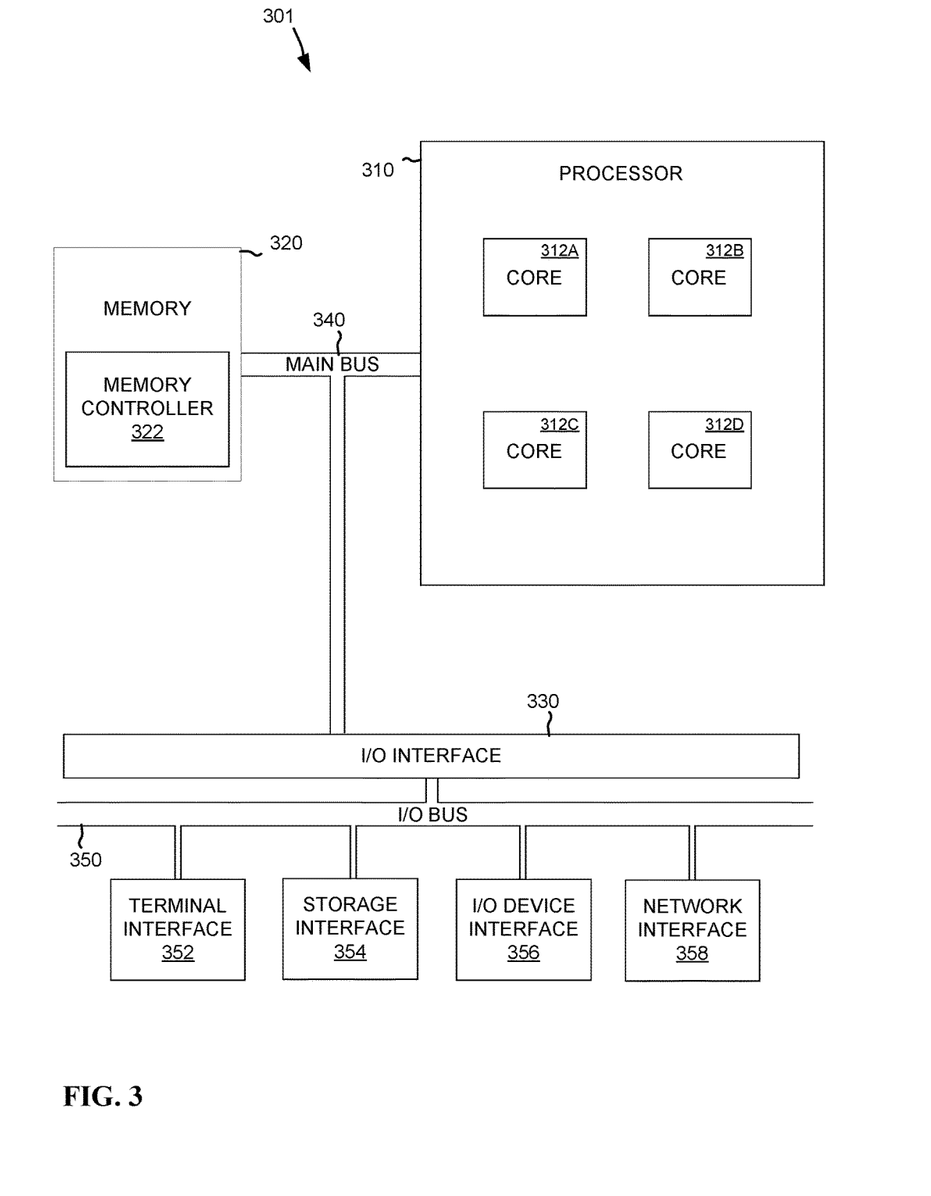
FIG. 3 depicts the representative major components of an example computer system that may be used, in accordance with embodiments of the present disclosure.

A security program 130 may be communicatively coupled to the computing network 100 for monitoring network traffic. The security program 130 may be one or more algorithms and hardware components that are able to monitor and view the traffic on the computing network 100. The security program 130 may be embodied as one or more lines of software running on an operating system. In some embodiments, the security program 130 may be embodied as one or more lines of firmware on an application specific integrated circuit. An example computer is depicted in FIG. 3 that may be capable of providing processing, memory, and input output for the security program 130. The security program 130 may create a security server 131 and a security client 132 for interfacing with the client 110 and server 120, respectively. The security server 131 may be considered a faux or fake server because it is impersonating the server 120. The security client 132 may be considered a faux or fake client because it is impersonating the client 110.

The security program 130 may operate as a man-in-the-middle between the client 110 and the server 120 with reduced processing power. In detail, the security program 130 may detect the client 110 attempting to establish a first secure session 140 to perform encrypted communication with the server 120. The client 110 may be sending requests through the network 100 for the first secure session 140. The security program 130 may intercept the requests and may, as the security server 131, generate responses that appear to be from the server 120. In some embodiments, the client 110 may be sending a first request. The first request may be a message compliant with a TLS handshake (e.g., a client hello message). The client 110 and the security server 131 may use one or more key exchange methods to exchange a first session key 160A for secure communication. In some embodiments, the client 110 and the security server 131 may use one or more key exchange methods to exchange a first intermediate for secure communication (e.g., a first pre-master secret utilized to derive the first session key 160A). The key exchange method between the client 110 and the security server 131 may be a Diffie-Hellman (DH) key exchange. The key exchange method between the client 110 and the security server 131 may be a Rivest-Shamir-Adleman (RSA) key exchange. The first request sent from the client 110, intended for the server 120, and intercepted by the security server 131 may include a first list of cipher suites 142.

Upon receiving the first list of cipher suites 142 from the client 120 the security program 130 may, through the security client 132, attempt to establish a second secure session 150 with the server 120. The security program 130 may alter the first list of cipher suites 142 to generate a second list of cipher suites 152. In some embodiments, the second list of cipher suites 152 may not include cipher suites that utilize a DH key exchange. In some embodiments, the second list of cipher suites 152 may only include cipher suites that utilize an RSA key exchange. The security client 132 may send a second request to the sever 120 that appears to be from the client 110. The second request may contain the second list of cipher suites 152. In response to the second request of the second secure session 150, the server 120 may respond to the security client 132 with a first response intended for the client 120. The first response may include a server selected cipher suite selected from the second list of cipher suites 152.

Upon receiving the server selected cipher suite, the security program 130 may generate a second response for the client 110 and may continue to establish the first secure session 140. In some embodiments, the second response of the security program 130 may completely correspond to the first response of the server 120 (e.g., same cipher suite as the server selected cipher suite). In some embodiments, the second response of the security program 130 may partially correspond to the first response of the server 120 (e.g., a similar encryption method or hashing function but a different key exchange algorithm). The security server 131 of the security program 130 may negotiate a first session key 160A with the client 110 and may finish establishing the first secure session 140. Any communication that the client 110 sends through the established first secure session 140 (i.e., any communication intended for the server 120) may be encrypted with the first session key 160A (either directly or through an intermediate).

Upon the security server 131 negotiating the first session key 160A, the security client 132 will continue to establish the second secure session 150 with the server 120. The security program 130 may make a second session key 160B by synching the first session key 160A. The security client 132 may encrypt the second session key 160B used in the key exchange method that the security client 132 and the server 120 agreed upon from the second list of cipher suites 152. The security client 132 and the server 120 may finish establishing the second secure session 150. Any communication that the server 120 sends through the established second secure session 150 (i.e., any communication intended for the client 110) may be encrypted with the second session key 160B (either directly or through an intermediate).

Because the second session key 160B is a copy of the first session key 160A, they may be considered the same and may be referred to collectively as a synchronized key 160 (alternatively, synchronized pre-master secret). After the first secure session 140 and the second secure session 150 are fully established, the client 110 and the server 120 may be using the same security parameters (e.g., pre-master secrets, master-secrets, encryption algorithms, session identifiers, hashing functions, random numbers, session identifiers, etc.). The client 110 and the server 120 may also be using the synchronized key 160. The security server 131 may now allow the messages from the client 110 to be sent along the network 100, without interception, to the server 120. The security client may now allow the messages from the server 120 to be sent along the network 100, without interception, to the client 110.

Because the security program 130 synchronized the session key 160 and other parameters of the first secure session 140 and the second secure session 150, security program may perform inspection of encrypted packets on a packet-by-packet basis. In detail, the security program 130 may intercept a first encrypted packet from the client 110 to the server 120; make a copy of the first encrypted packet; and transmit the first encrypted packet to the server 120. The security program 130 may next use the synchronized key 160 to decrypt the copied first encrypted packet and inspect the information inside. Likewise, the security program 130 may intercept a second encrypted packet from the server 120 to the client 110; make a copy of the second encrypted packet; and transmit the second encrypted packet to the client 110. The security program 130 may next use the synchronized key 160 to decrypt the copied second encrypted packet and inspect the information inside. In some embodiments, the security program 130 may perform inspection on a record-by-record basis—each record may be in the form of one or more packets.

Figure 2:
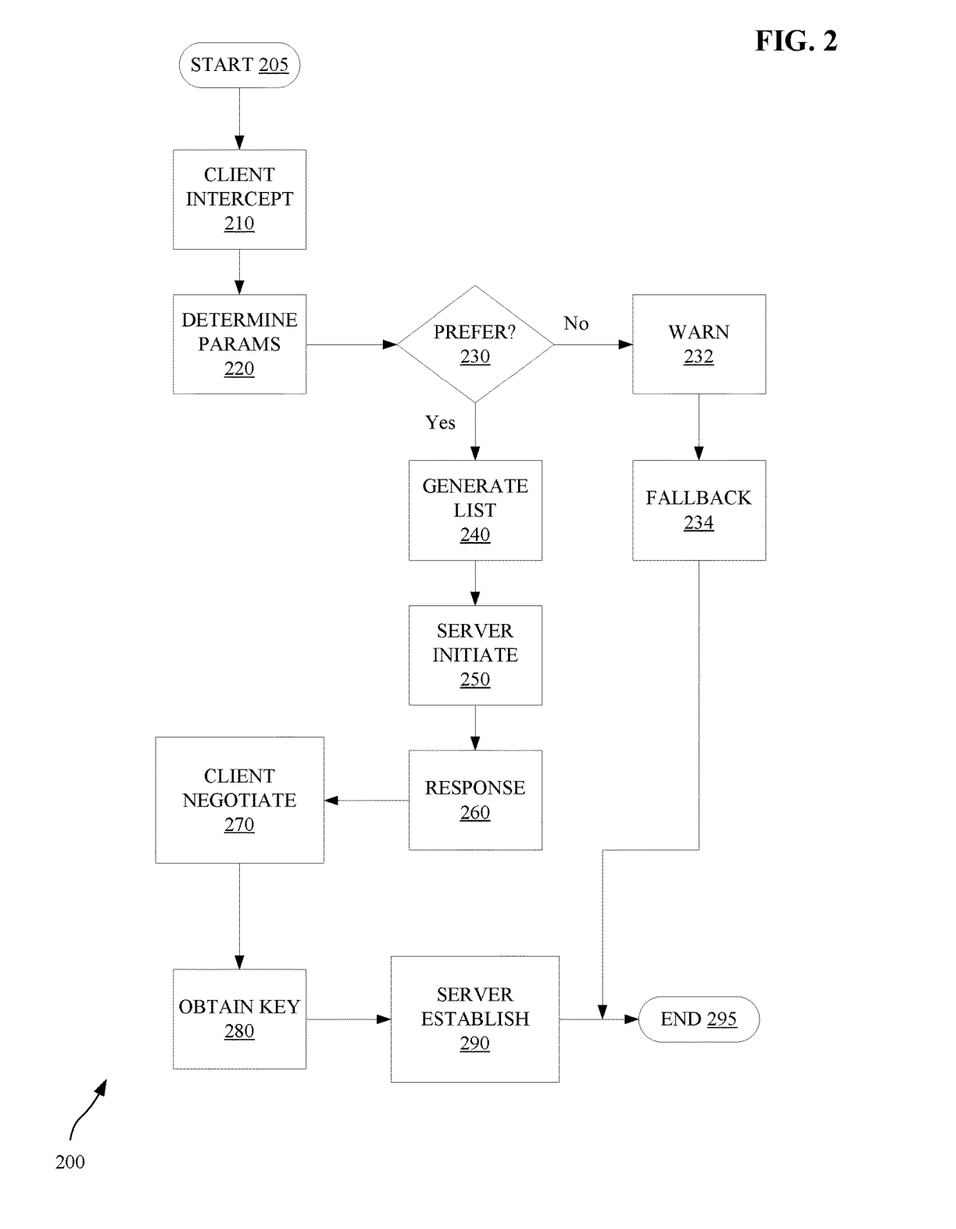
FIG. 2 depicts an example method for attempting to reduce the processing required to perform a man-in-the-middle inspection of a secure communication in accordance with embodiments of the present disclosure.

FIG. 2 depicts an example method 200 for attempting to reduce the processing required to perform a man-in-the-middle inspection of a secure communication in accordance with embodiments of the present disclosure. Method 200 may be performed by a security program that operates on one or more components of a computer system such as the computer system 301 of FIG. 3. Method 200 may include more or less operations than those depicted and, in some embodiments, certain operations may be combined or separated. The operations of method 200 may be performed continuously (e.g., every 100 milliseconds, every sixteen milliseconds, etc.). The security system that performs one or more operations of method 200 may be connected to a network that transmits one or more packets between network devices (e.g., laptops, smartphones, personal digital assistants, wearable computers, etc.). Method 200 may be performed responsively to the creation or transmission of network packets, or other network activity, of the devices.

From start 205, a network communication from a client device (e.g., a laptop, a server, a smartphone, etc.) is intercepted at 210. The network communication from the client device may be in the form of one or more network packets consistent with a network standard (e.g., the transmission control protocol and internet protocol). The client device may be communicating with one or more other devices including a server device (e.g., a laptop, a server, a smartphone, etc.). The interception, at 210, may be based on the type of network communication: intercepting packets that form a first encryption initiation by the client device to begin encrypted communication with the server device. The first initiation may be in the form of a one or more packets consistent with a standard handshake (e.g., an SSL handshake, a TLS handshake, a ClientHello message, etc.).

The first initiation may contain one or more client-created parameters. The parameters may define various standards that the client device may use to carry out the encrypted communication (e.g., a first list of cipher suites, list of compression methods, the highest TLS version supported by the client device, etc.). The parameters may also define various pieces of information necessary to form a secure connection (e.g., client identifiers, secure session information, a pre-master secret, a random number, etc.). At 220 the security system may determine the parameters from the intercepted first initiation. The determination may include recording a first client random value (e.g., a 32-bit random value provided by the client as part of a key exchange algorithm). The determination may include parsing the packets to locate the first list of cipher suites.

The determination, at 220, may also include identifying a preferred key exchange algorithm from the first list of cipher suites. In some embodiments, a preferred key exchange algorithm may be a key exchange algorithm that does not require a client device and a server device to each participate in key generation (e.g., a DH key exchange algorithm, perfect forward secrecy, etc.). In some embodiments, a preferred key exchange algorithm may be a key exchange algorithm where a client device provides a key to a server device (e.g., an RSA key exchange algorithm). The key to be exchanged may be a session key used to encrypt SSL or TLS traffic. In some embodiments, the key to be exchanged may be an intermediate of a session key such as a master secret. In embodiments with the intermediate, the session key may be derived from the pre-master-secret through the intermediate (e.g., a master secret derived from the pre-master secret). In embodiments with the intermediate, the pre-master secret may be provided by the client (e.g., RSA) or derived by the client and server (e.g., DH).

Each cipher suite in a list of cipher suites may refer to a variety of values. The values may relate to the method of key exchange, a method of encryption or other settings used for a TLS or SSL network protocol for secure communication. For example the following Cipher Suite 1 indicates a 'ECDHE_RSA' key exchange algorithm, a 'AES_128_GCM' bulk encryption algorithm, and a 'SHA256' message authentication code:

CIPHER SUITE 1
TLS_ECDHE_RSA_WITH_AES_128_GCM_SHA256

Cipher Suite 1 uses an elliptical curve variant of a Diffie-Hellman key exchange algorithm. This key exchange algorithm entails the client and the server each computing part of the session key. Cipher Suite 1 also uses an Advanced Encryption Standard bulk encryption algorithm with a 128-bit key-size. This bulk encryption algorithm indicates the manner that the secure messages will be encrypted—the secure messages will be decrypted with the session key. Cipher Suite 1 further uses a Secure Hash Algorithm 2 function with a 256-bit length digest for message authentication.

If a preferred key exchange algorithm is identified, at 230, the security system may generate a second list of cipher suites at 240. The generation, at 240, may be based on the preferred key exchange algorithm that was identified in the determined client parameters. The generation, at 240, may be based on selecting a subset of the cipher suites that are in the first list of cipher suites. The subset selection criteria may be to select cipher suites that specify a key exchange algorithm that is not partially based on a server-provided session key (e.g., DH key exchange). The subset selection criteria may be to select cipher suites that specify a key exchange algorithm entirely based on a client-provided session key (e.g., RSA key exchange). Two example lists of cipher suites before and after modification by method 200 are provided in the following Table 1:

TABLE 1

| | |
|---|---|
| TLS_RSA_WITH_RC4_128_MD5 | TLS_RSA_WITH_RC4_128_MD5 |
| TLS_DH_anon_WITH_RC4_128_MD5 | |
| TLS_KRB5_WITH_RC4_128_MD5 | |
| TLS_RSA_WITH_RC4_128_SHA | TLS_RSA_WITH_RC4_128_SHA |
| TLS_KRB5_WITH_RC4_128_SHA | |
| TLS_ECDH_ECDSA_WITH_RC4_128_SHA | |
| TLS_ECDHE_ECDSA_WITH_RC4_128_SHA | |
| TLS_ECDH_RSA_WITH_RC4_128_SHA | |
| TLS_ECDHE_RSA_WITH_RC4_128_SHA | |
| TLS_ECDH_anon_WITH_RC4_128_SHA | |
| TLS_RSA_WITH_IDEA_CBC_SHA | TLS_RSA_WITH_IDEA_CBC_SHA |
| TLS_KRB5_WITH_IDEA_CBC_SHA | |
| TLS_RSA_WITH_DES_CBC_SHA | TLS_RSA_WITH_DES_CBC_SHA |
| TLS_DH_DSS_WITH_DES_CBC_SHA | |
| TLS_DH_RSA_WITH_DES_CBC_SHA | |
| TLS_DHE_DSS_WITH_DES_CBC_SHA | |
| TLS_DHE_RSA_WITH_DES_CBC_SHA | |
| TLS_DH_anon_WITH_DES_CBC_SHA | |
| TLS_KRB5_WITH_DES_CBC_SHA | |

The left column of Table 1 indicates an example first list of cipher suites provided by a client device. The cipher suites in the first list contain a variety of key exchange algorithms such as RSA, DH, ECDH, among others. Each cipher suite may also contain a variety of other values such as the bulk encryption algorithms. The list generation, at 240, is performed on the example first list to create the second list in the right column of Table 1. The second list of Table 1 is performed by selecting the subset of cipher suites that contain an RSA key exchange algorithm.

A second initiation is provided to the server device at 250. The server device that receives the second initiation is the device that was intended by the network communication of the client device. The second initiation may be in the form a TLS/SSL message (e.g., a second ClientHello generated by the security system). The second initiation may contain all the parameters of the first initiation except for the first list of cipher suites. Instead, the second initiation may contain the second list of cipher suites, generated at 240. The second initiation may also contain other information that is from the client (e.g., a physical media access control address, an internet protocol address, etc.). Because the second initiation may contain parameters and other information from the client device, the server device may believe that it is corresponding with the client device.

At 260 a response may be received from the server device that is responsive to the second initiation, sent at 250. The response may include one or more network packets designed to establish a secure connection with the security system that performs method 200. From the perspective of the server device the received response may be responsive to the network communication from a client device intercepted, at 210; from the perspective of the server device, the second initiation, sent at 250, was from the client device (though in actuality the second initiation was from the security system). In some embodiments, the response may include a ServerHello message from the server device. In some embodiments, the response may include a cipher suite that the server selected based on the second list of cipher suites. In some embodiments, the response may include a certificate or other method to authenticate the server.

At 270 the security system may negotiate a first secure session with the client device. The first secure session may be based on the client parameters that were determined, at 220. The first secure session with the client device may also be based on the response received from the server device, at 260. The security system may utilize the selected cipher suite of the response to negotiate the first secure session directly. For example, if a selected cipher suite from the server device was TLS_RSA_WI_TH_DES_CBC_SHA, then the security system may provide a cipher suite of TLS_RSA_WI_TH_DES_CBC_SHA to the client device along with a ServerHello generated by the security system.

In some embodiments, the security system may provide a cipher suite to the client device that is based on the selected cipher suite of the response but is not identical. In detail, the provided cipher suite of the security system may include all of the components of the selected cipher suite except the key exchange algorithm. The corresponding cipher suite selected by security system may utilize a key exchange algorithm that is considered more secure and that may be more processing intensive to negotiate the first secure session, at 270. This may reduce the likelihood that the security system is detected by the client device. For example and using Table 1, the selected cipher suite from the server device is TLS_RSA_WITH_RC4_128_SHA in a response, at 260. Continuing the example, the security system may choose corresponding cipher suite TLS_ECDH_RSA_WITH_RC4_128_SHA. Further continuing the example, the security system may negotiate the first secure session, at 270, by generate a ServerHello that includes the corresponding cipher suite TLS_ECDH_RSA_WITH_RC4_128_SHA.

During the negotiation of the first secure session, at 270, a session key used for secure communication between the client device and the security system may be obtained at 280. In some embodiments, the session key may be obtained, at 280, by the client device providing the session key to the security system. In some embodiments, the session key may be obtained, at 280, by a formula that utilizes information provided by both the client device and the security system (e.g., random numbers and pre-session keys as part of a Diffie-Hellman key exchange).

After the session key is obtained, at 280, the security system may establish a second secure session with the server device at 290. The second secure session may use the session key exchange algorithm of the selected cipher suite from the server device. Because the second secure session uses a key exchange algorithm from the second list of cipher suites, the session key may be established by the security system encrypting a session key and transmitting it to the server. For example, a session key is encrypted using an RSA algorithm with a public key provided by the server device to the security system. The second secure session may be established, at 290, with the session key that was obtained at 280.

Because the first secure session and the second secure session utilize the same key, the security system may be able to inspect communication between the client device and the server device with reduced overhead (e.g., processing power, memory, network utilization, etc.). For example, the client device believes that the first secure session is with the server device. Any message sent through the first secure session is encrypted with the session key that was exchanged between the client device and the security system. Likewise, the server device believes that the second secure session is with the client device. Any message sent through the second secure session is encrypted with the session key that was exchanged between the server device and the security system. To view secure traffic between the client device and the sever device, the security system need only view and decrypt the secure traffic utilizing the session key.

If a preferred key exchange algorithm is not identified, at 230, the security system may warn an administrator of reduced performance when viewing encrypted traffic between the client device and the server device at 232. In detail, because the first cipher suite does not contain a preferred key exchange algorithm, the security system may need to establish two secure sessions that utilize two different security keys. Using two different session keys may require the security system to intercept and perform a decryption of each secure client message sent from the client device to the server device with one of the two session keys. Then the security system may need to reencrypt each secure client message with the other of the two session keys and forward the secure client message to the server device. Likewise, the security system may need to perform a decryption of each secure server message sent from the server device to the client device with the other of the two session keys. Then the security system may need to reencrypt each secure server message with the one of the two session keys and forward the secure server message to the client device.

To warn the administrator, at 232, the secure server may need to generate a message. The message may contain information regarding the client device and the server device (e.g., the name of the client device, the name of the server device, the internet protocol address of the client device, the internet protocol address of the server device, etc.). The message may contain information regarding the secure session (e.g., the list of cipher suites sent by the client device). The message may be entered into a database of the computer system. The message may be displayed by a user interface of an operating system being executed on the computer system. The message may be in the format of a text message of a short message service to an administrator device (e.g., sent to a smart phone of the administrator). The message may be in the format of an email to an administrator device (e.g., to a laptop of the administrator). After the administrator has been warned, at 230, the security system may fallback and use a less efficient security algorithm at 234 (e.g., establishing two secure sessions). After the second secure session is established at 290 (alternatively, after the less efficient security algorithm has been used at 234) method 200 ends at 295.

FIG. 3 depicts the representative major components of an example computer system 301 that may be used, in accordance with embodiments of the present disclosure. It is appreciated that individual components may vary in complexity, number, type, and\or configuration. The particular examples disclosed are for example purposes only and are not necessarily the only such variations. The computer system 301 may comprise a processor 310, memory 320, an input/output interface (herein I/O or I/O interface) 330, and a main bus 340. The main bus 340 may provide communication pathways for the other components of the computer system 301. In some embodiments, the main bus 340 may connect to other components such as a specialized digital signal processor (not depicted).

The processor 310 of the computer system 301 may be comprised of one or more cores 312A, 312B, 312C, 312D (collectively 312). The processor 310 may additionally include one or more memory buffers or caches (not depicted) that provide temporary storage of instructions and data for the cores 312. The cores 312 may perform instructions on input provided from the caches or from the memory 320 and output the result to caches or the memory. The cores 312 may be comprised of one or more circuits configured to perform one or methods consistent with embodiments of the present disclosure. In some embodiments, the computer system 301 may contain multiple processors 310. In some embodiments, the computer system 301 may be a single processor 310 with a singular core 312.

The memory 320 of the computer system 301 may include a memory controller 322. In some embodiments, the memory 320 may comprise a random-access semiconductor memory, storage device, or storage medium (either volatile or non-volatile) for storing data and programs. In some embodiments, the memory may be in the form of modules (e.g., dual in-line memory modules). The memory controller 322 may communicate with the processor 310, facilitating storage and retrieval of information in the memory 320. The memory controller 322 may communicate with the I/O interface 330, facilitating storage and retrieval of input or output in the memory 320.

The I/O interface 330 may comprise an I/O bus 350, a terminal interface 352, a storage interface 354, an I/O device interface 356, and a network interface 358. The I/O interface 330 may connect the main bus 340 to the I/O bus 350. The I/O interface 330 may direct instructions and data from the processor 310 and memory 320 to the various interfaces of the I/O bus 350. The I/O interface 330 may also direct instructions and data from the various interfaces of the I/O bus 350 to the processor 310 and memory 320. The various interfaces may include the terminal interface 352, the storage interface 354, the I/O device interface 356, and the network interface 358. In some embodiments, the various interfaces may include a subset of the aforementioned interfaces (e.g., an embedded computer system in an industrial application may not include the terminal interface 352 and the storage interface 354).

Logic modules throughout the computer system 301—including but not limited to the memory 320, the processor 310, and the I/O interface 330—may communicate failures and changes to one or more components to a hypervisor or operating system (not depicted). The hypervisor or the operating system may allocate the various resources available in the computer system 301 and track the location of data in memory 320 and of processes assigned to various cores 312. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   intercepting, by an intermediary device, a first client encryption initiation from a client, the first client encryption initiation intended for a server;
   generating, by the intermediary device, a modified client encryption initiation;
   initiating, by the intermediary device and based on the modified client encryption initiation, a second client encryption initiation to the server;
   receiving, by the intermediary device and from the server and in response to the initiated second client encryption initiation, a server response;
   negotiating, by the intermediary device and based on the intercepted first client encryption initiation and based on the server response, a first secure connection with the client;
   obtaining, by the intermediary device and from the first secure connection, a session key to perform secure communications with the client; and
   establishing, by the intermediary device and based on the server response and based on the obtained session key, a second secure connection with the server, wherein the establishment of the second secure connection also establishes a third secure connection directly between the client and the server.

2. The method of claim 1, wherein the first client encryption initiation contains one or more client parameters, the method further comprising:
   determining, from the one or more client parameters, a first list of cipher suites;
   identifying, from the determined first list of cipher suites, a preferred key exchange algorithm; and
   wherein the generating the modified client initiation is based on the identified preferred key exchange algorithm, wherein the modified client initiation includes a second list of cipher suites, the second list of cipher suites containing only key exchange algorithms from the first list of cipher suites that uses the preferred key exchange algorithm,
   wherein the initiating the second client encryption initiation is further based on the second list of cipher suites, and
   wherein the negotiating the first secure connection with the client is further based on the one or more client parameters.

3. The method of claim 2, wherein the preferred key exchange algorithm is a Rivest Shamir Adleman (RSA) key exchange algorithm.

4. The method of claim 2, wherein the preferred key exchange algorithm is not a Diffe Hellman (DH) algorithm.

5. The method of claim 2, wherein each cipher suite in the first list of cipher suites contains a bulk encryption algorithm and the generating the second list is not based on the bulk encryption algorithm of each cipher suite.

6. The method of claim 2, wherein each cipher suite in the first list of cipher suites contains a message authentication code (MAC) algorithm and the generating the second list is not based on the MAC algorithm of each cipher suite.

7. The method of claim 2, wherein each cipher suite in the first list of cipher suites contains a pseudorandom function and the generating the second list is not based on the pseudorandom function of each cipher suite.

8. The method of claim 2, wherein the one or more client parameters includes a client random number, and wherein the initiated second client encryption initiation is also based on the client random number, and wherein the server response includes a server random number, and wherein the negotiating the first secure connection is further based on the server random number.

9. The method of claim 8, wherein the one or more client parameters includes a pre-master secret, and wherein the session key is derived from the client random number, the server random number, and the pre-master secret.

10. The method of claim 1, wherein the intercepting of the first client encryption initiation further comprises connecting to a network that enables communication between the client and the server, the method further comprising:
    disconnecting from the network;
    reconnecting to the network;
    intercepting an encrypted communication from the client;
    creating a copy of the intercepted encrypted communication;
    decrypting the copy with the session key; and
    transmitting the intercepted encrypted communication to the server.

11. The method of claim 1, wherein the intercepting of the first client encryption initiation further comprises connecting to a network that enables communication between the client and the server, the method further comprising:
    disconnecting from the network;
    reconnecting to the network;
    intercepting an encrypted communication from the server;
    creating a copy of the intercepted encrypted communication;
    decrypting the copy with the session key; and
    transmitting the intercepted encrypted communication to the client.

12. A system for performing network intermediary between a client and a server, the system comprising:
    a memory;
    a processor in communication with the memory, wherein the processor is configured to perform a method comprising:
       intercepting a first client encryption initiation from a client, the first client encryption initiation intended for a server;
       generating a modified client encryption initiation;
       initiating, based on the modified client encryption initiation, a second client encryption initiation to the server;

receiving, from the server and in response to the initiated second client encryption initiation, a server response;

negotiating, based on the intercepted first client encryption initiation and based on the server response, a first secure connection with the client;

obtaining, from the first secure connection, a session key to perform secure communications with the client; and establishing, based on the server response and based on the obtained session key, a second secure connection with the server, wherein the establishment of the second secure connection also establishes a third secure connection directly between the client and the server.

13. The system of claim 12, wherein the intercepting of the first client encryption initiation further comprises connecting to a network that enables communication between the client and the server, the method further comprising:

disconnecting from the network;
reconnecting to the network;
intercepting an encrypted communication from the client;
creating a copy of the intercepted encrypted communication;
decrypting the copy with the session key; and
transmitting the intercepted encrypted communication to the server.

14. The system of claim 12, wherein the intercepting of the first client encryption initiation further comprises connecting to a network that enables communication between the client and the server, the method further comprising:

disconnecting from the network;
reconnecting to the network;
intercepting an encrypted communication from the server;
creating a copy of the intercepted encrypted communication;
decrypting the copy with the session key; and
transmitting the intercepted encrypted communication to the client.

15. The system of claim 12, wherein the first client encryption initiation contains one or more client parameters, the method further comprising:

determining, from the one or more client parameters, a first list of cipher suites;
identifying, from the determined first list of cipher suites, a preferred key exchange algorithm; and
wherein the generating the modified client initiation is based on the identified preferred key exchange algorithm, wherein the modified client initiation includes a second list of cipher suites, the second list of cipher suites containing only key exchange algorithms from the first list of cipher suites that uses the preferred key exchange algorithm,
wherein the initiating the second client encryption initiation is further based on the second list of cipher suites, and
wherein the negotiating the first secure connection with the client is further based on the one or more client parameters.

16. A computer program product comprising a computer readable storage medium having program instructions embodied therewith, the program instructions executable by a computer to perform a method comprising:

intercepting, by an intermediary device, a first client encryption initiation from a client, the first client encryption initiation intended for a server;

generating, by the intermediary device, a modified client encryption initiation;

initiating, by the intermediary device and based on the modified client encryption initiation, a second client encryption initiation to the server;

receiving, by the intermediary device and from the server and in response to the initiated second client encryption initiation, a server response;

negotiating, by the intermediary device and based on the intercepted first client encryption initiation and based on the server response, a first secure connection with the client;

obtaining, by the intermediary device and from the first secure connection, a session key to perform secure communications with the client; and establishing, by the intermediary device and based on the server response and based on the obtained session key, a second secure connection with the server, wherein the establishment of the second secure connection also establishes a third secure connection directly between the client and the server.

17. The computer program product of claim 16, wherein the intercepting of the first client encryption initiation further comprises connecting to a network that enables communication between the client and the server, the method further comprising:

disconnecting from the network;
reconnecting to the network;
intercepting an encrypted communication from the client;
creating a copy of the intercepted encrypted communication;
decrypting the copy with the session key; and
transmitting the intercepted encrypted communication to the server.

18. The computer program product of claim 16, wherein the intercepting of the first client encryption initiation further comprises connecting to a network that enables communication between the client and the server, the method further comprising:

disconnecting from the network;
reconnecting to the network;
intercepting an encrypted communication from the server;
creating a copy of the intercepted encrypted communication;
decrypting the copy with the session key; and
transmitting the intercepted encrypted communication to the client.

19. The computer program product of claim 16, wherein the first client encryption initiation contains one or more client parameters, the method further comprising:

determining, from the one or more client parameters, a first list of cipher suites;
identifying, from the determined first list of cipher suites, a preferred key exchange algorithm; and
wherein the generating the modified client initiation is based on the identified preferred key exchange algorithm, wherein the modified client initiation includes a second list of cipher suites, the second list of cipher suites containing only key exchange algorithms from the first list of cipher suites that uses the preferred key exchange algorithm,
wherein the initiating the second client encryption initiation is further based on the second list of cipher suites, and wherein the negotiating the first secure connection with the client is further based on the one or more client parameters.

* * * * *